(No Model.)
C. HÜFFNER.
SCARF PIN.
No. 357,318. Patented Feb. 8, 1887.
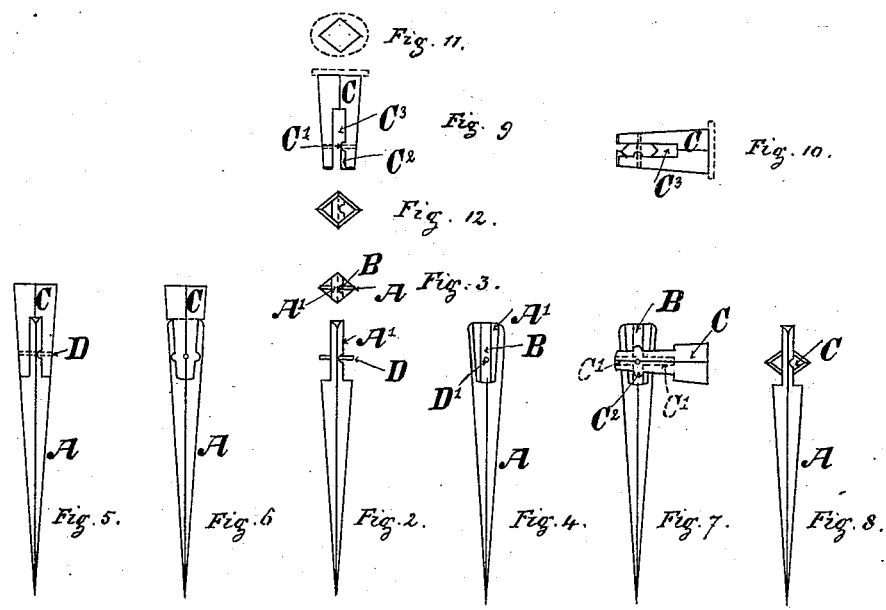
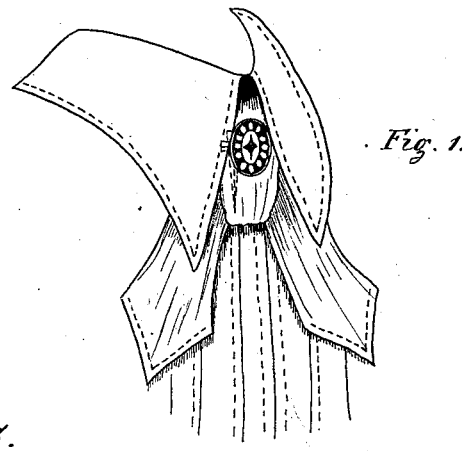
Witnesses.
Inventor.

UNITED STATES PATENT OFFICE.

CARL HÜFFNER, OF STUTTGART, WÜRTEMBERG, GERMANY.

SCARF-PIN.

SPECIFICATION forming part of Letters Patent No. 357,318, dated February 8, 1887.

Application filed June 7, 1886. Serial No. 204,318. (No model.)

*To all whom it may concern:*

Be it known that I, CARL HÜFFNER, of Stuttgart, Würtemberg, Germany, have invented a new and Improved Scarf-Pin, of which the following specification is a full, clear, and exact description.

This invention relates to a folding scarf-pin, which offers the following advantages over the ordinary scarf-pin: First, the new pin does not bend as the other pins generally do when introduced into the scarf; second, it is very handy; can be easily adjusted, and will never get loose; third, after the pin has been introduced into the scarf and the shank turned down it stands strongly fixed and cannot possibly be lost.

That part of the pin which enters into the scarf may be of a round, oval, square, or any other form; but it is preferable to make it of a square section, thus preventing the possibility of its turning in the cloth. The pin will readily enter, and there will be seen nothing of it but the head.

The accompanying drawings show the pin in different positions and views.

Figure 1 is a perspective view of a scarf with pin attached. Fig. 2 is a front view of the pin with the head C removed; Fig. 3, a top view of the same; Fig. 4, a side view of the same; Fig. 5, a front view of the pin with head attached; Fig. 6, a side view of the same. Fig. 7 is a side view of the pin and head, showing the head turned at a right angle to the pin; Fig. 8, a back view of the same; Fig. 9, a side view of the head separated from the pin; Fig. 10, a side view of the head attached to the pin; Fig. 11, a top view of the pin, and Fig. 12 a bottom view of the same.

A is the lower part or shank of the pin, which is contracted at its upper end to form a tongue, A'. One of the faces of the tongue is provided with a groove, B.

C is the upper part or head of the pin, which forms a right angle with the shank when the same is turned around a small pivot, D, passing through the head and tongue. The lower part of this head C is provided with a notch or incision, $C^3$, which corresponds with the tongue A' of the shank A.

If the two pieces A and C are not folded, but are in line, a longitudinal rib, C', inside of the incision $C^3$, will enter the groove B of the tongue A. On folding the pin, however, the head will slide alongside of the tongue A', after which a nose, $C^2$, will fall into the groove B, and thus fix the head of the pin in a horizontal position.

I claim as my invention—

The combination of shank A, having grooved tongue A', with notched pivoted head C, having rib C', and nose $C^2$, substantially as specified.

In testimony whereof I hereunto sign my name, in the presence of two subscribing witnesses, this 18th day of May, 1886.

CARL HÜFFNER.

Witnesses:
   EDUARD ZIEGLER,
   FRIEDR. S. LÜBACK.